Aug. 18, 1942.  W. F. ALLENBY  2,293,483
COFFEE MAKER
Filed April 4, 1941
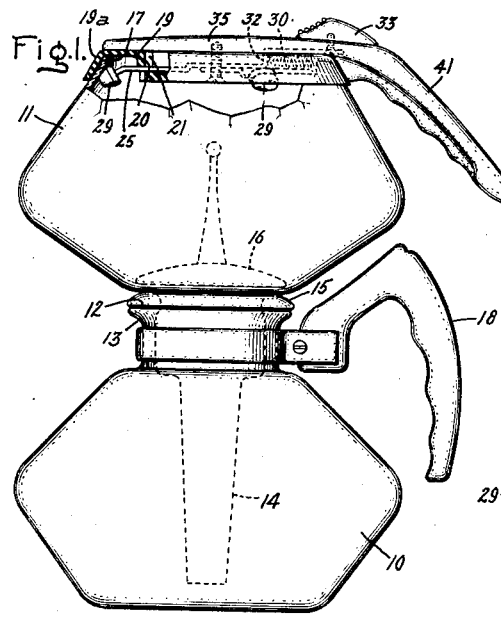
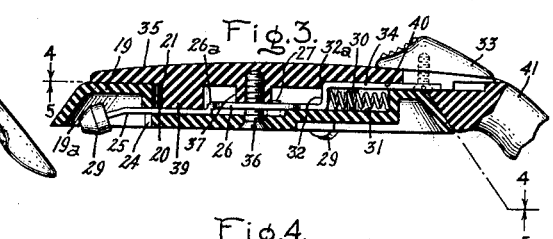
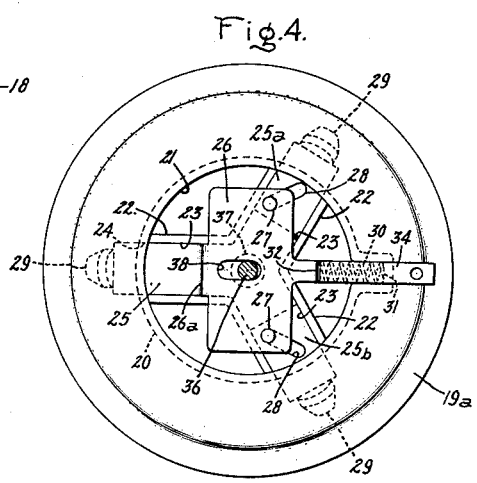
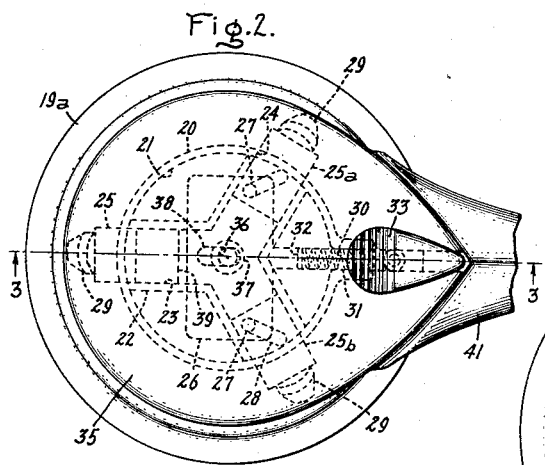
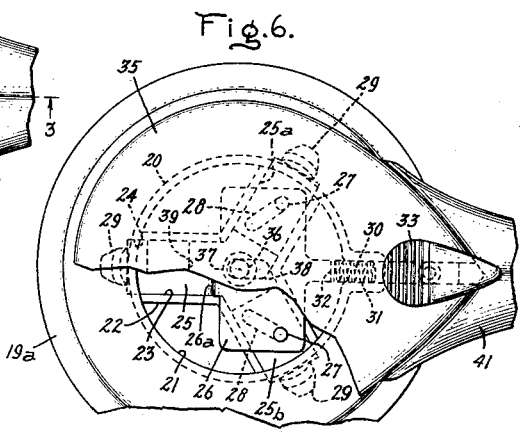
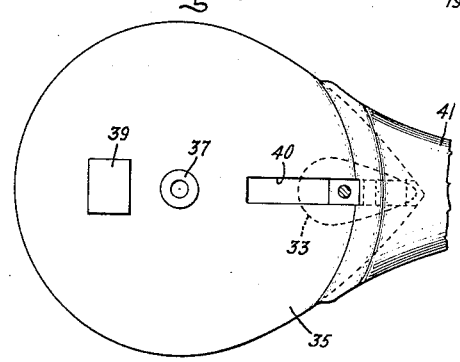
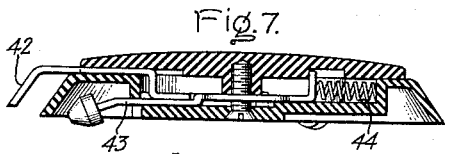
Inventor:
William F. Allenby,
by Harry E. Dunham
His Attorney.

Patented Aug. 18, 1942

2,293,483

UNITED STATES PATENT OFFICE 2,293,483

COFFEE MAKER

William F. Allenby, Stratford, Conn., assignor to General Electric Company, a corporation of New York Application April 4, 1941, Serial No. 386,923

6 Claims. (Cl. 53—3)

This invention relates to coffee makers, more particularly to coffee makers having a bowl that is provided with an opening therein, such as a vacuum-type coffee maker which is provided with a water heating bowl and a coffee infusion bowl in liquid transfer relation with the water heating bowl, and it has for its object the provision of an improved cover structure for one of the bowls.

The cover structure arranged in accordance with this invention is particularly adapted to cover the opening in the top of the infusion bowl of the coffee maker, and it contemplates the provision of a cover structure for the bowl constructed and arranged so that it can be locked to the bowl whereby it may function as a handle for manipulating the bowl.

In accordance with this invention, the cover structure comprises a cover which is arranged to close the opening in the bowl. The cover is provided with a section located opposite the outer surface of the wall of the bowl around the opening, and it carries a plurality of fingers constructed and arranged to move outwardly to engage the inner surface of the wall opposite this section of the cover so as to clamp the cover to the wall. A manually operable member is connected to the fingers to move them as a group away from the wall to release the cover, and spring means are connected to the fingers so as to bias them as a group outwardly toward the wall.

For a more complete understanding of this invention, reference should be had to the accompanying drawing in which Fig. 1 is a vertical elevation, partly in section, of a vacuum-type coffee maker provided with a cover structure arranged in accordance with this invention; Fig. 2 is a top plan view of the cover structure used in the coffee maker of Fig. 1; Fig. 3 is a sectional view taken through the line 3—3 of Fig. 2, and looking in the direction of the arrows; Figs. 4 and 5 are sectional views taken through the lines 4—4 and 5—5 respectively of Fig. 3 and looking in the directions of the arrows associated with these lines; Fig. 6 is a view similar to Fig. 2, but having a part broken away, and illustrating certain of the elements in different operative positions than they occupy in Fig. 2; and Fig. 7 is a fragmentary sectional view illustrating a modified form of this invention.

Referring more particularly to Figs. 1 to 6 inclusive, this invention has been shown as applied to a vacuum-type coffee maker comprising a lower water heating bowl 10, and an upper coffee infusion bowl 11. As shown, the water heating bowl 10 is provided in its upper end with an opening 12 which is formed by an upright neck 13 on the upper end of the bowl. The upper bowl is provided with a depending liquid transfer tube 14 which is inserted through the opening 12 into the lower bowl 10. Secured to the upper end of the transfer tube 14 is a rubber gasket 15 which seats in the neck 13 to support the upper bowl on the lower bowl, and to effect a fluid-tight seal between the two bowls when the upper bowl is seated on the lower bowl. A suitable filter 16 is mounted in the upper bowl 11 over the transfer tube 14. The upper bowl, as shown, is provided at its upper end with a relatively large opening 17 through which the filter is inserted, and through which the coffee grounds can be placed in the bowl. Generally, the bowls 10 and 11 and the transfer tube 14, connected to the bowl 11, are formed of a suitable heat-resistant glass. And in the specific form of the invention illustrated, the walls of the bowls taper outwardly and downwardly from their upper ends to substantially the mid-sections of the bowls where they incline inwardly and downwardly, as clearly shown in Fig. 1.

It will be understood that in making coffee in a vacuum-type coffee maker of this character, water is placed in the lower bowl 10 and the coffee grounds are placed in the upper bowl 11 over the filter 16. Heat is then applied to the lower bowl by any suitable means, such as an electric hotplate (not shown), and when the water has been heated sufficiently it is forced upwardly through the tube 14 into the infusion bowl 11 by the generation of pressure in the water heating bowl 10 above the liquid level. This steeps the coffee grounds so as to make the coffee brew. When the heat applied to the bowl 10 is reduced the vapor in this bowl condenses and creates a vacuum so as to draw the coffee brew back through the tube 14 into the bowl 10. After this, it is necessary to remove the upper bowl 11 from the lower bowl 10 in order to dispense the coffee brew from the lower bowl. The lower bowl is provided with a suitable handle 18 which is used to tilt the bowl to pour the coffee brew.

I have provided a suitable cover structure for the opening 17 in the upper end of the upper bowl which can be locked to the upper bowl so that the cover can be used as a handle to remove the upper bowl without the necessity of touching the heated walls of the bowl. This cover structure comprises a cover 19 which is arranged to be placed over the opening 17, as clearly shown in Fig. 1. The cover 19 is provided with a depending angular flange-like wall or skirt 19a which has the same inclination as the side wall of the upper bowl adjacent the opening 17, as clearly shown in Fig. 1. This skirt 19a embraces and closely fits the upper portion of the side wall of the bowl around the opening 17, as shown in this figure.

The cover 19 is provided with a central cylindrical depressed extension 20 whose vertical central axis coincides with the vertical central axis of the cover. This extension defines a circular recess 21 centrally positioned in the cover. The bottom wall of this recess is provided with walls 22 defining a plurality of radial passageways 23 lying in a common plane. These passageways 23 at their outer ends terminate in openings 24 in the vertical wall of the depression 20. Mounted within these passageways are a series of rigid fingers 25, 25a and 25b which are arranged to slide inwardly and outwardly radially with reference to the skirt 19a. As shown, the outer ends of the fingers project through the openings 24

Rigidly secured to the finger 25 is a plate 26 which is located in a plane above the plane of the fingers 25, 25a and 25b, as clearly shown in Fig. 3, and which is rigidly secured to the finger 25 by the shoulder 26a. The plate 26 carries a pair of fingers or pins 27 which are received in elongated openings 28 provided for them in the fingers 25a and 25b. These openings 28, as shown, are inclined to the line of movement of these fingers, and function as cam surfaces so constructed and arranged that when the finger 25 is moved outwardly, the fingers 25a and 25b are moved outwardly with it, and conversely, when the finger 25 is moved inwardly, the other fingers 25a and 25b are moved inwardly with it. In other words, all of the fingers move outwardly and inwardly as a group.

The ends of the fingers carry resilient feet 29 formed of any suitable material, but preferably they will be made of rubber. These feet may be molded directly to the fingers, or they may be formed as separate members provided with slots or openings that may be fitted to the ends of the fingers. As clearly shown in the drawing, the feet are inclined so that when the fingers are moved outwardly, as shown in Fig. 1, the inclined surfaces of the feet will abut the inner inclined surface of the section of the side wall of the bowl 11 that is opposite the skirt 19a. It will be observed that when the fingers are thus forced outwardly they will clamp this section of the wall to the skirt 19a so that the cover is securely locked to the bowl.

The fingers are forced outwardly to thus clamp the cover to the bowl by means of a suitable compression spring 30. This compression spring is mounted in a short recess 31 extending outwardly from the recess 21. As shown, the outer end of the compression spring 30 is received in the recess 31, and abuts its outer wall, while the inner end of the spring extends into the recess 21 and is connected with the finger 25 in such a way that it biases this finger outwardly. For this purpose, an upright member (or bend) 32 is formed on the plate 26 and serves as an abutment for the inner end of the compression spring. It will be observed that in view of this arrangement, the compression spring biases the finger 25 outwardly, and at the same time biases the fingers 25a and 25b outwardly, because, as has been explained, these latter fingers are mechanically connected to the finger 25 to move outwardly with it. Preferably, the abutment 32 will be formed integrally with the plate 26. When the cover is removed from the bowl 11, the spring 30 forces the abutment 32 against a stop 32a which limits the outward movement of the fingers. However, when the cover is applied to the bowl the fingers generally will engage the bowl before the member 32 engages the stop 32a.

The finger 25 and consequently the fingers 25a and 25b are moved inwardly against the force of the spring 30 so as to release the cover 19 by means of a manually operable knob 33. This knob is mechanically connected to the finger 25 through the plate 26, the abutment 32, and an extension 34 which is rigidly secured to the abutment, and which extends outwardly over the recess 31 in a plane parallel to the plane containing the plate 26 and the plane containing the fingers 25, 25a and 25b. When the knob is pushed outwardly, that is toward the right as viewed in Figs. 1, 2, 3 and 6, it moves the plate 26 inwardly and consequently draws the finger 25 inwardly with the plate; and as has been previously explained, this movement of the plate 26 also draws the fingers 25a and 25b inwardly. When the knob is released, the spring 30 operates the fingers outwardly toward the skirt 19a.

The cover 19 is covered by means of a suitable cap 35 which as shown substantially covers the entire upper surface of the cover. The cap is secured to the cover by means of a screw 36. This screw is directed through an opening provided for it in the center of the cover and is received in threaded engagement with a boss 37 provided on the underside of the cap at the center. The plate 26 is provided with an elongated opening 38 through which the screw 36 is passed, and which is sufficiently elongated to provide for the sliding movement of the plate.

The boss 37 bears against the upper surface of the plate 26 to hold it downwardly in its proper operative position. The cover is also provided with a downwardly extending protuberance 39 which bears against the upper surface of the finger 25 to hold it downwardly in its recess 23. The plate 26 itself functions to hold the other fingers 25a and 25b in their recesses 23. Also, the cover is provided in its under surface with a shallow recess 40 in which the strip 34 attached to the knob 33 slides.

Preferably, both the cover 19 and the cap 35 will be formed of a material having a low heat conductivity, such as a suitable phenol condensation product.

It will be understood that in the operation of the device, when it is desired to place the cover over the opening 17, the knob 33 will be moved outwardly to retract the fingers 25, 25a and 25b, whereupon the cover may be placed upon the bowl 11 and the knob 33 released to permit the spring 30 to move the fingers outwardly to lock the cover to the bowl in the manner previously described. This firmly clamps the cover to the bowl, and the cover may thereafter be grasped to remove the bowl 11 from the lower bowl 10 at the completion of the coffee making operation. Generally, this operation requires considerable effort, but the fragile walls of the bowl 11 will not be broken by the application of this force to them because of the provision of resilient feet 29 on the ends of the fingers 25, 25a, and 25b. It will be observed that the inclined surfaces of these feet are relatively large and thereby apply the holding pressure to a fairly large area of the fragile wall of the bowl.

If desired, the cap may be provided with a handle 41 which may be grasped to assist in manipulating the bowl 11. When the handle is used, it is preferable to form it integrally with the cap 35, as shown. It is also preferable to locate the handle directly opposite the knob 33 so that when the handle is grasped to manipulate the upper bowl, the knob may be engaged by the thumb and moved toward the left to increase the pressure between the fingers 29 and the walls of the bowl to more securely attach the cover to the bowl.

The knob and handle may be eliminated if desired. In the form of the invention shown in Fig. 7, these members are eliminated and the fingers are operated by means of an actuator 42 secured to the finger 43 which corresponds to the finger 25 of the first form shown in Figs. 1-6. If the cover be grasped and this member 42 moved inwardly toward the cover, the fingers will be operated inwardly to release the cover as they are when the knob is moved outwardly in the first form of the invention described. It will be understood that the remaining fingers of the form shown in Fig. 7 will be operated from the finger 43 as are the corresponding fingers of the first form operated by the arm 25. It will also be understood that the fingers will be biased outwardly by means of a compression spring 44 acting on the fingers in the same way as in the first form.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a coffee maker having a bowl provided with an opening therein, a cover structure for closing said opening having a cover for said opening and means for locking said cover to said bowl comprising, a plurality of radially positioned fingers on said cover mounted for movement outwardly to locking positions with reference to said bowl and inwardly to unlocking positions with reference thereto, a plate rigidly secured to one of said fingers, means for moving said plate to operate said one finger inwardly and outwardly with reference to said bowl, and pins on said plate operating in cam slots in the other of said fingers so that when said plate is operated to move said one finger said other fingers are operated inwardly and outwardly with it.

2. In a vacuum-type coffee maker, a cover structure for closing the opening in one of the bowls of the coffee maker comprising a cover for said opening, a finger mounted on said cover for radial movement with reference to the wall of said bowl, a spring acting on said finger for moving it outwardly with reference to said wall, a knob attached to said finger for moving it inwardly against the force of said spring, a plurality of other fingers mounted on said cover for radial movement with reference to said wall, and means connecting said other fingers to said first finger so that they are moved outwardly with reference to said wall by said first finger so as to secure the cover to said wall when said first finger is moved outwardly by said spring, and are moved inwardly with said first finger so as to release said cover when said first finger is moved inwardly by said knob.

3. In a coffee maker having a bowl provided with an opening therein, a cover structure for closing said opening comprising a cover for said opening having a skirt embracing a section of the outer wall surface around said opening, a finger mounted on said cover for movement inwardly and outwardly with reference to said section, a spring forcing said finger outwardly, a knob attached to said finger for moving it inwardly against the force of said spring or outwardly with the force of said spring, a plurality of other fingers mounted on said cover for movement inwardly and outwardly with reference to said section, said other fingers being provided with cam surfaces, and projections operated with said first finger engaging said surfaces for moving said other fingers outwardly when said first finger moves outwardly so as to clamp said cover to said wall section, and for moving them inwardly so as to release said cover when said first finger moves inwardly.

4. In a coffee maker having a bowl provided with an opening therein, a cover structure for closing said opening having a cover for said opening and means for locking said cover to said bowl comprising, a plurality of radially positioned fingers on said cover mounted for movement outwardly to locking positions with reference to said bowl and inwardly to unlocking positions with reference thereto, a plate rigidly secured to one of said fingers, a spring acting on said plate so as to force said one finger outwardly to its locking position, a member attached to said plate whereby it may be manually moved to operate said one finger inwardly against the force of said spring, and pins on said plate operating in cam slots in the other of said fingers so that when said plate is operated to move said one finger said other fingers are moved inwardly and outwardly with it.

5. In a coffee maker provided with a bowl having an opening therein, a cover structure for said bowl comprising a cover for closing said opening, clamping means carried by said cover mounted on said cover for movement outwardly to clamp said cover to said bowl and inwardly to release said cover, a handle for said cover, and a knob opposite said handle attached to said clamping means for moving said means inwardly to release said bowl when said knob is moved toward said handle and the knob being positioned with relation to said handle so that when the handle is grasped to remove the cover the knob can be engaged by the thumb and pushed in the opposite direction to increase the pressure between said clamping means and the bowl.

6. In a coffee maker having a bowl provided with an opening therein, a cover structure for closing said opening having a cover for said opening and means for locking said cover to said bowl comprising, walls defining a plurality of radial passageways lying in a common plane, a plurality of locking fingers mounted for radial movement in said passageways to locking and unlocking positions with reference to said bowl, a plate in a plane parallel to said first named plane secured to one of said fingers for moving it in said passageway, a spring acting on said plate biasing it to force said one finger to its locking position, a knob attached to said plate projecting from said cover whereby it may be manually engaged to move said plate to carry said one finger away from its locking position against the force of said spring, and means on said plate engaging the other of said fingers for operating them inwardly and outwardly with said one finger.

WILLIAM F. ALLENBY.